US007878045B2

(12) United States Patent
Brinkmann

(10) Patent No.: US 7,878,045 B2
(45) Date of Patent: Feb. 1, 2011

(54) APPARATUS AND USE OF THE APPARATUS FOR THE DETERMINATION OF THE DENSITY OF A PLASMA

(76) Inventor: Ralf-Peter Brinkmann, Carl-Zuckmayer-Strasse 15, 40699 Erkrath (DE)

( * ) Notice: Subject to any disclaimer, the term of this patent is extended or adjusted under 35 U.S.C. 154(b) by 317 days.

(21) Appl. No.: 12/294,322

(22) PCT Filed: Mar. 23, 2007

(86) PCT No.: PCT/DE2007/000542

§ 371 (c)(1), (2), (4) Date: Sep. 24, 2008

(87) PCT Pub. No.: WO2007/110060

PCT Pub. Date: Oct. 4, 2007

(65) Prior Publication Data

US 2009/0133471 A1 May 28, 2009

(30) Foreign Application Priority Data

Mar. 24, 2006 (DE) ....................... 10 2006 014 106

(51) Int. Cl.
*G01N 9/32* (2006.01)

(52) U.S. Cl. ...................................................... 73/32 R

(58) Field of Classification Search ................. 73/32 R; 324/464

See application file for complete search history.

(56) References Cited

U.S. PATENT DOCUMENTS 5,703,488 A 12/1997 Ohmi et al. ................. 324/464

(Continued)

FOREIGN PATENT DOCUMENTS

DE 40 26 299 A1 2/1992

(Continued)

OTHER PUBLICATIONS

Blackwell D D et al: "Measurement of absolute electron density with a plasma impedance probe" Review of Scientific Instruments AIP USA, vol. 76, No. 2, Feb. 2005, pp. 23503-1, XP002456440 ISSN: 0034-6748.

(Continued)

*Primary Examiner*—Hezron Williams
*Assistant Examiner*—Tamiko D Bellamy
(74) *Attorney, Agent, or Firm*—Henry M. Feiereisen; Ursula B. Day

(57) ABSTRACT

Device for determining the density of a plasma, with of a probe (1) which can be immersed into the plasma, with a probe head (2) in form of a three-axis ellipsoid, and a handle (3) connected to the probe head (2), wherein the probe head (2) has a sheath (4) and a probe core (5, 5*a*) surrounded by the sheath (4), wherein the surface (8) of the probe core (5, 5*a*) has electrode areas (9, 10) of opposite polarity which are insulated from each other. The probe core consists of electrodes (6, 7), to which a signal is applied. The absorption of that signal is measured and evaluated as a function of the frequency. Based on a multipole expansion, a mathematical model is constructed with which the absorption spectrum of the probe can be unambiguously evaluated. For a particular design of the probe, the response can be restricted to a single resonance, from which the electron density of the plasma (to be inferred from the resonance frequency) can be found by an unambiguous evaluation algorithm.

15 Claims, 6 Drawing Sheets

U.S. PATENT DOCUMENTS

| | | | | |
|---|---|---|---|---|
| 6,339,297 | B1 | 1/2002 | Sugai et al. | 315/111.21 |
| 6,744,211 | B2 | 6/2004 | Sugai et al. | 315/111.21 |
| 6,894,474 | B2 * | 5/2005 | Cox et al. | 324/71.1 |
| 2002/0047543 | A1 | 4/2002 | Sugai et al. | 315/111.21 |
| 2005/0016683 | A1 | 1/2005 | Kim et al. | 156/345.28 |

FOREIGN PATENT DOCUMENTS

| | | | |
|---|---|---|---|
| DE | 4200636 | A1 | 7/1993 |
| DE | 69605643 | T2 | 4/2000 |
| EP | 0692926 | A1 | 1/1996 |
| EP | 0719077 | A1 | 6/1996 |

OTHER PUBLICATIONS

J.-C. Schauer, S. Hong, J. Winter: “Electrical measurements in dusty plasmas as a detection method for the early phase of particle formation”, Plasma Sources Sci. Technol. 13 (2004) 636-645.

* cited by examiner

APPARATUS AND USE OF THE APPARATUS FOR THE DETERMINATION OF THE DENSITY OF A PLASMA

BACKGROUND OF THE INVENTION

The invention applies to a device and the use of such a device for the determination of the density of a plasma.

Plasmas—electrically activated gases—find use in a variety of technical fields; their particular physical properties are frequently the basis of innovative products and processes. The exact supervision and—in the case of deviations—the adjustment of the plasma state are essential for the success of processes which are based on the use of technical plasmas. An important parameter of plasmas is the space and time dependent electron density $n_e$. To know its value is essential for the characterization of plasmas. However, in technological plasmas, particularly in reactive plasmas, the determination of the electron density is difficult.

The determination of the plasma density (and of other plasma parameters) is subject of a scientific discipline of its own, plasma diagnostics. A number of diagnostic methods have already been developed and employed. Examples are optical methods, which come in a wide variety. A first classification distinguishes emission spectroscopy, absorption spectroscopy, and fluorescence spectroscopy. Mass spectroscopy and plasma monitoring are particle diagnostic methods. The recording of V/I characteristics, the use of Langmuir probes, and microwave interferometry belong to electrical diagnostics Of these methods, however, only a few are industry-compatible. The notion of "industry compatibility" refers to a number of important requirements for the applicability of a diagnostic method in production lines and other industrial environments: Robustness of the method against contamination and perturbations, no interference with the monitored process, low complexity of the diagnostic process and its evaluation, online capability. Low cost with respect to investment and maintenance is also important. Process end-point detection and the identification of hardware faults are particular industrial measurement tasks.

A promising method for industrial plasma diagnostics is plasma resonance spectroscopy. In this method, a high-frequency signal in the Giga-Hertz range is coupled into the plasma. The signal reflection is measured as a function of the frequency. In particular the resonances—maxima of the absorption—are determined. The location of these maxima is a function of the desired central plasma parameter, the electron density. At least in principle, it can be determined this way in an absolute and calibration-free manner. High-frequency measurements have little or no influence on the technical process, and are to a large extent insensitive against contamination. Their requirements on investment and maintenance are very small. Plasma resonance spectroscopy is characterized by simple system integration properties, high measurement speed, and good online capabilities. A disadvantage of plasma resonance spectroscopy is that a mathematical model is required to evaluate of measurement (i.e., to calculate the electron density from the resonance curve). In addition, particular technology is required for the spatial resolution of the measurement (i.e., for the determination of the electron density as a function of the position).

In various publications (U.S. Pat. No. 6,339,297 B1, U.S. Pat. No. 6,744,211 B2), Sugai et al. disclosed a method for measuring the plasma density on the basis of resonance spectroscopy, and described a particular design of an absorption probe. The probe consists of a dielectric tube, closed at one end, open at the other. The closed end of the probe is located in the plasma, while the open end is located outside of the plasma chamber. A coaxial cable acting as an antenna is inserted into the tube.

The plasma absorption probe proposed by Sugai et al. has a convincingly simple design. The evaluation of the signal, however, is problematic: It is difficult to deduce the really interesting quantity, the electron density of the plasma, from the measured primary signal (the frequency curve of the absorption).

The underlying reason can be understood from a theoretical analysis of the absorption diagnostic method. The probe is represented by a system of two electrodes A and B, which are introduced into a spatially bounded region (see FIG. 10). The boundary is typically formed by a grounded wall, i.e., by a surface W which has the high-frequency potential zero. The bounded region contains dielectric and plasma with an at least partially unknown distribution. (More exactly: The unknowns are the distribution of the plasma, and the thickness of the plasma boundary layer which is produced by the plasma itself and which acts as dielectric.) When high-frequency voltages are applied to the two electrodes, currents can be determined and analyzed as function of the frequency. On the basis of this abstract model one ca demonstrate theoretically that the response of the probe, which is relevant for the measurement of the electron density, can be described as the superposition of isolated resonances (modes). This is illustrated by the schematic electrical circuit diagram in FIG. 11, which represents each of the modes by an LCR series resonance circuit. Obviously, there exists coupling between the two electrodes (A to B), as well as coupling between the respective electrodes and the wall (A to W, and B to W, respectively.)

The schematic electrical circuit diagram demonstrates the disadvantages of the previous method according to Sugai et al.:

- The resonance characteristics results from the superposition of an infinite number of sub-modes. Practically, it is not possible to determine the corresponding resonance circuit parameters from the primary measurement curve (which has only limited accuracy).
- Even if the parameters were determinable, it would be impossible in practice to determine the actual plasma density: Although the parameters could be calculated for a given density with considerable effort, but this would not solve the "inverse problem" in a measurement.
- In the resonance characteristics, the coupling between the electrodes is superimposed on the coupling to the distant wall. The latter correspond to a collective excitation of the entire plasma and hence do not only involve the electron density at the probe location. A spatial resolution of the measurement thus becomes impossible.

EP 0 692 926 A1 discloses a diagnostic method which analyses the current-voltage characteristics of a probe introduced in a low pressure plasma. This is essentially a variant of a Langmuir probe, with a modification that prevents perturbations of the current-voltage characteristics caused by high-frequency with a suitable device.

EP 0 719 077 A1 describes a diagnostic method which is known under the name SEERS (self-excited electron resonance spectroscopy). In this method, the electron density in a low-pressure plasma is measured by using a resonance. The method is passive. It utilizes the self-excitation of a resonance in an HF plasma which results from a nonlinear interaction of the high-frequency power, which supplies the energy, with the plasma boundary layer. The method is therefore only suitable for asymmetric HF discharges. Collective, rather than local, excitation modes are observed. Thus, the method does not allow for spatial resolution. Consequently, not a probe, but a wall sensor is used.

DE 696 05 643 T2 describes a device for measuring the ion flux onto a surface exposed to a low-pressure plasma. This method does not use spectral techniques. The resonance phenomenon is also not utilized. Instead, the method is based on measuring the discharge rate of a capacitor which is placed between an HF voltage source and a probe in form of a plate in contact with the plasma.

DE 42 00 636 A1 describes the high-frequency compensation of an electrical Langmuir probe. It is proposed to utilize the probe cable as part of the circuit which suppresses the high-frequency. This allows placing the other elements of the circuit farther away from the probe tip, outside of the reactor. No frequency-tunable high-frequency is introduced, and no spectral measurements are performed. Instead, the method evaluates a DC current-voltage characteristics. The invention is directed to a method for compensating the perturbation of this curve by superimposed high-frequency.

DE 40 26 229 C2 proposes to prevent coating of an electrical Langmuir probe in reactive plasmas by heating. The probe is here alternatingly connected by a cyclically operated switch with a measurement circuit and a heater power supply. Also with this method, no frequency-tunable high-frequency is supplied and no spectral measurements are performed. Instead, the method evaluates a DC current-voltage curve. The technical core concept is to provide a method for preventing the perturbation of the curve by layers deposited by the plasma. To describe the state of the art, the following publication should also be mentioned: J.-C. Schauer, S. Hong, J. Winter: "Electrical measurements in dusty plasmas as a detection method for the early phase of particle formation", Plasma Sources Sci. Technol. 13 (2004) 636-645.

SUMMARY OF THE INVENTION

It is an object of the invention to provide a device and the use of that device for measuring the electron density in a plasma, particularly in a low-pressure plasma, which enables a spatially resolved measurement, which has a high measurement accuracy with an unambiguous evaluation rule, and which is also industry-compatible.

The aforementioned significant disadvantages of the previous method are overcome by a device for measuring the density of a plasma, including a probe, which can be immersed in the plasma, with a probe head in form of a three-axes ellipsoid, and with means for coupling a signal into the probe head, wherein the probe head has a sheath and a probe core surrounded by the sheath, wherein the surface of the probe core has electrode areas with opposite polarity which are insulated from each other. A device according to the invention is used for measuring the density of a plasma.

Specifically, a device and a method for measuring the electron density in a plasma, in particular in a low-pressure plasma, is disclosed, which has a high measurement accuracy with an unambiguous, mathematically simple evaluation rule, which enables spatially resolved measurements and additionally is industry-compatible. This is attained by a probe design, wherein the shape of the probe allows an explicit solution of the aforementioned mathematical problems, i.e., establishes a formula relating the primary measurement curve to the actual plasma density, and wherein the probe suppresses the coupling with the distant wall, so that the method reacts only on the local electron density.

The device for measuring the density of a plasma according to the invention includes a probe which can be immersed into the plasma, with a probe head and means for coupling a signal to the probe head. The signal is a high-frequency signal or another suitable broadband signal, for example a pulse train.

Mathematically, an arbitrary signal, for instance a pulse train, can be interpreted as a superposition of sinusoidal oscillations. This is the statement of Fourier's theorem. It should be noted that only structures with a time duration that is not smaller than the inverse of the bandwidth of the measurement electronics can be resolved. Depending on the plasma whose density is to be measured, a bandwidth of several Giga-Hertz is considered sufficient.

The probe head has the shape of a tri-axial ellipsoid, wherein the axes of the ellipsoid have different lengths. The probe head consists of a sheath and a core covered by the sheath. The surface of the probe core has electrode areas which are insulated from each other, and which are connected to the different polarities of an externally generated signal, for example a high-frequency voltage.

The design of the probe head as a tri-axial ellipsoid results from a theorem, according to which the following mathematical concepts are only feasible for so-called separable coordinate systems, characterized as "general elliptical coordinates." Because the surface of the described probe head must correspond to a coordinate surface, only "non-degenerate elliptical coordinates" have to be included. Particularly simple conditions apply to the case where the three axes are selected to have the same size; in this case the ellipsoid becomes a sphere, and the corresponding coordinates become spherical polar coordinates.

The described mathematical arguments rely on the so-called multipole expansion. If the conditions are met (separable coordinates), this method allows to explicitly describe (with a formula) the mathematical relationship underlying the schematic electrical circuit diagram of FIG. 10. This result is an infinite sum expression. The higher terms, however, correspond to "higher multipole fields" and their weight decreases so quickly that the series may be truncated after a few terms. Under certain circumstances, only the first term, the so-called dipole component, is important. If the ellipsoid and the structure of the electrode areas are selected symmetrically with respect to a symmetry plane through the center of the probe core, then the zero-term vanishes (so-called monopole component).

The probe design according to the invention has a number of fundamental advantages. By using a suitable design of the insulating areas, and by varying the ratio of sheath diameter to core diameter, the composition of the entire characteristic of individual multipole terms can be changed over a wide range. For example, all terms except for the dipole contribution can be eliminated. In this way, a holder used to feed the signal, in particular a high-frequency signal, to the probe can be placed in a high-frequency-free region so as not to perturb the measurement. Elimination of the monopole contribution also eliminates coupling to the wall.

In principle, the signal can also be coupled in by optical means, for example using a glass fiber, rather than via a holder with an electrical cable. This could even further reduce the electrical interference with the plasma. The optical signals can be transformed into electrical signals by an autonomous electronic circuit disposed in the probe, which then would also have to retransmit the measurement results (e.g., optically) to an evaluation unit.

The signal could also be generated within the probe head by a suitable miniature electronic circuit, instead of coupling the signal form an external source. This makes it possible to either scan the frequency and to search for the maximum of the absorption, or to construct an oscillatory circuit which oscillates autonomously on this or a similarly characteristic frequency. Again, the measured data should be transmitted back to an evaluation unit, for example optically.

If—instead of the high-frequency signal—a different signal of sufficient bandwidth is coupled in, for example a pulse train, then the resonance frequency can be determined by suitable mathematical methods, for example by the Fourier transform method.

These remarks will now be explained with reference to an example. The formulas are particularly simple for spherical probes. If the radius $R_e$ of the probe core is small compared to the radius $R_d$ of the sheath, then the dipole contribution dominates. Assuming, for example, that the relative permittivity of the sheath is $e_r=2$, that the ratio of the inner to the outer radius of the probe was selected as $R_e/R_d=0.5$, and that the thickness d of the plasma boundary layer surrounding the probe is small compared to $R_d$, then the resonance frequency $\omega_{res}$ follows from the following equation that applies to this particular situation:

$$\omega_{res}^2 \approx 0.583\omega_p^2.$$

Here, $\omega_p$ is the local plasma frequency of the plasma which has a fixed relation to the electron density $n_e$. The solution for the electron density is:

$$n_e \approx 2.1 f_{GHZ}^2 \times 10\ \mathrm{cm}^{-3}.$$

The relatively simple and—in particular—unambiguous evaluation rule tailored for the corresponding elliptical and, more particularly, spherical shape of the probe allows the determination of the local plasma density with high accuracy.

The measurement method is very robust, particularly against the influence of reactive plasmas, without causing contamination of the plasma. The device according to the invention and the probe of the device can be manufactured a cost-effectively and thus especially industry-compatible.

BRIEF DESCRIPTION OF THE DRAWING

An exemplary embodiment of the invention will now be described with reference to the drawings, which show in.

DETAILED DESCRIPTION OF PREFERRED EMBODIMENTS

Figure 1:
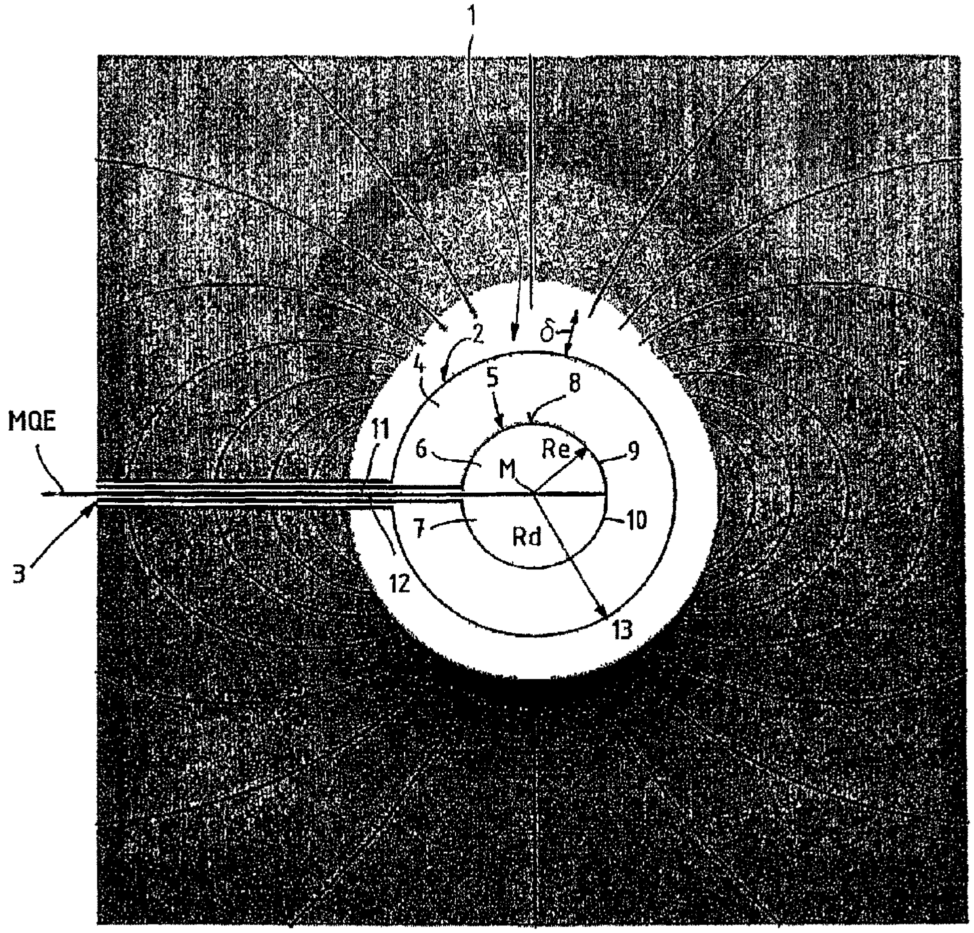
FIG. 1 a cross-sectional view of a first embodiment of a probe.

FIG. 1 shows the probe 1 as part of a device (not shown in detail) for measuring the electron density of a plasma. The probe 1 includes a spherical probe head 2 connected to a slim handle 3. FIG. 1 shows the configuration of probe 1 in a purely schematically drawing to illustrate the concept of the invention. All dimensions of FIG. 1 are chosen arbitrarily and are only meant to illustrate the concept of the invention.

The core of the probe 1 is the probe head 2 which consists of two shells. An outer sheath 4 of constant wall thickness surrounds a spherical probe core 5. The radii of the probe core and the sheath are denoted with $R_e$ und $R_d$, respectively. The probe core 5 includes two electrodes 6, 7, which are arranged symmetrically with respect to a plane MQE extending through the center M of the probe core 5, so that the surface 8 of the probe core 5 has electrode areas 9, 10 of opposite polarity. The electrodes 6, 7 are connected via the lines 11, 12 to a high-frequency source which supplies a high-frequency signal to the probe core 5 and generates an electrical field, as indicated by the depicted field lines. The field lines extend inside a plasma in which probe head 2 is located. A boundary layer 13 which surrounds the probe 1 has the thickness d in the region of the probe head 2.

Figure 2:
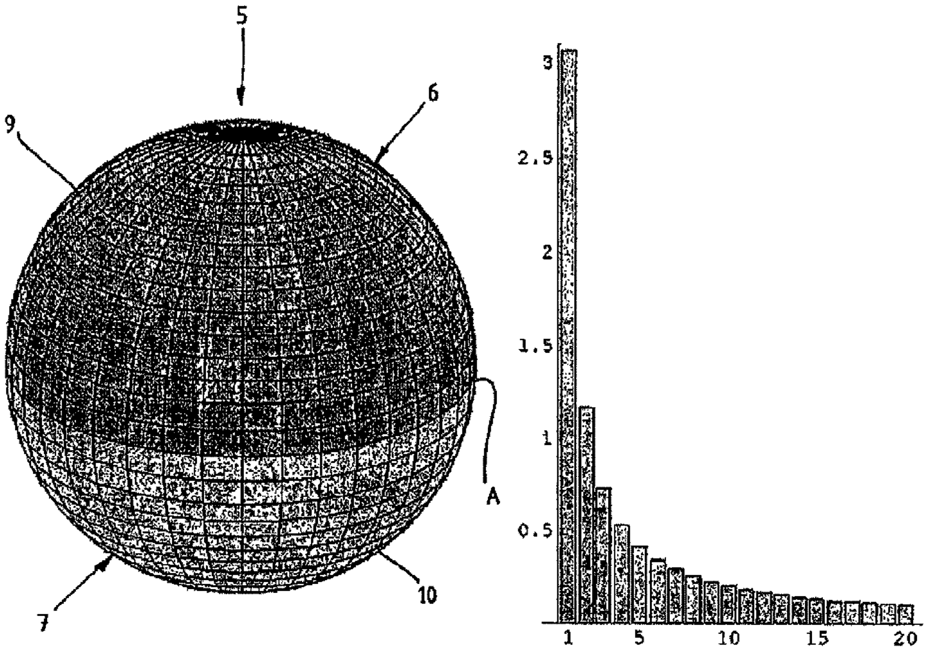
FIG. 2 an enlarged depiction of the first embodiment of the probe core and a diagram of the multipole coefficients, based on the depicted structure of the probe core.

FIG. 2 shows a first possible circuit configuration, i.e., a possible configuration of the electrodes 6, 7 of a probe core 5, with the configuration of the electrodes 6, 7 in this exemplary design corresponding to that of FIG. 1. The coefficients of the multipole expansion of this probe head are depicted in right half of the Figure. As can be seen, the multipole coefficient denoted as 1, i.e., the dipole component of the multipole expansion, has by far the largest weight; whereas the coefficients of the other multipole fields decrease relatively quickly.

Figure 3:
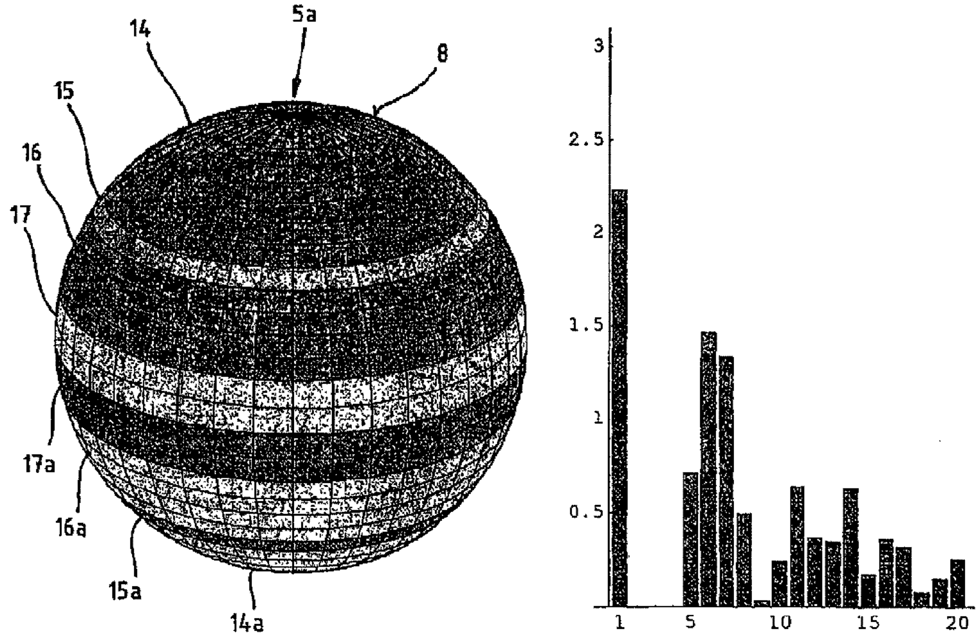
FIG. 3 a probe core with a more complex structure and the corresponding multipole coefficients.

The exemplary embodiment of FIG. 3 shows a probe core 5*a* with a more complex surface circuit structure, i.e., a multilayer electrode configuration. Unlike the exemplary embodiment of FIGS. 1 and 2, where only one electrode area was related to a certain polarity on each side of the symmetry plane MQE (indicated in FIG. 1 by the location of the equator A), electrode areas 14, 14*a*; 15, 15*a*; 16, 16*a*; 17, 17*a* with different polarity alternate in FIG. 3. The aforedescribed electrode areas are disk-shaped spherical zones of different width which alternate in a stacked arrangement.

As can be seen from the multipole coefficients for this probe head illustrated in the right half of FIG. 3, certain multipole coefficients of higher order can be completely suppressed by a suitable circuit structure of the surface 8 of the probe core 5, while other multipole coefficients are amplified. The resulting freedom can be used, for example, to separate the primary resonance better from other resonances and thereby improve the measurement accuracy.

Figure 4:
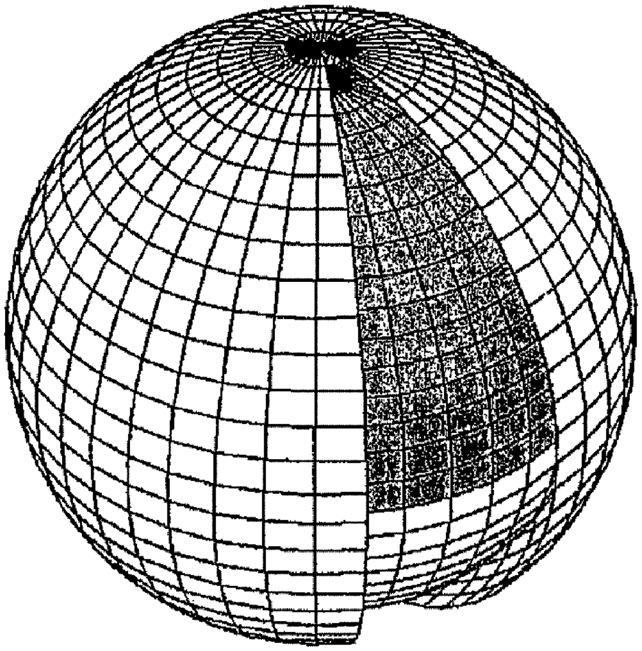
FIGS. 4 and 5 two different embodiments of a probe head with different radius ratios.
Figure 5:
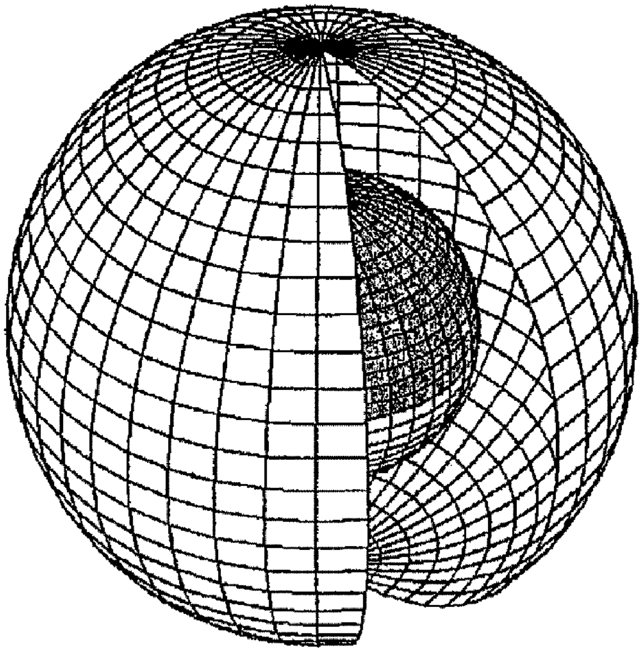

A further important parameter for measuring the electron density of a plasma is the ratio between the radius $R_e$ of the probe core 5 and the outer radius of the probe head. In FIG. 4, the ratio $R_e/R_d$ is, for example, equal to 0.9, whereas the ratio $R_e/R_d$ in FIG. 5 is about 0.5.

Figure 6:
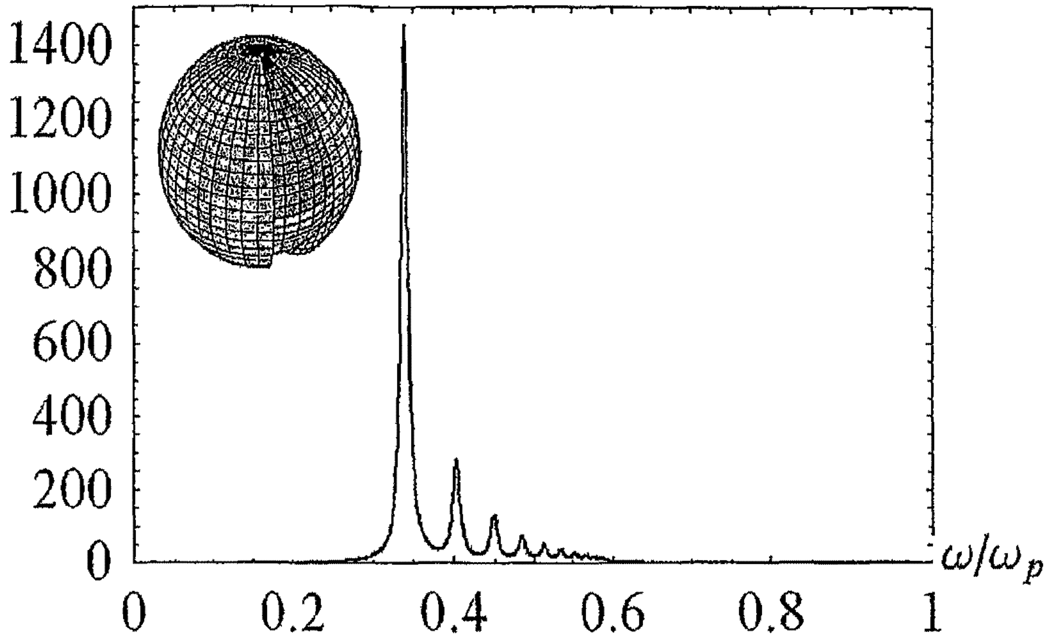
FIG. 6 a spectrogram based on a measurement carried out with the probe having simple structure according to FIG. 4.
Figure 7:
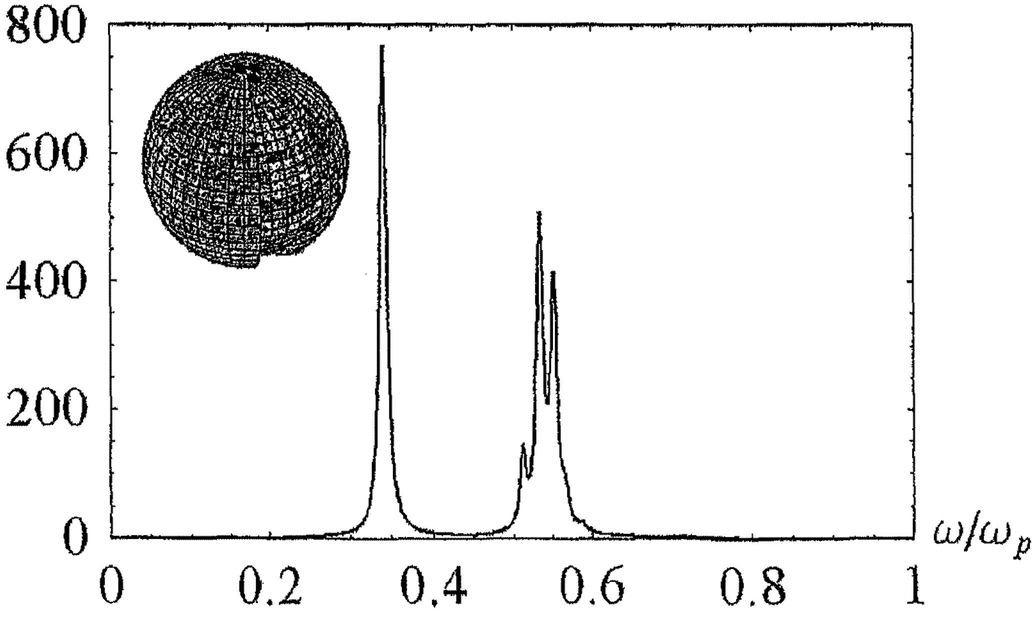
FIG. 7 a spectrogram of a measurement carried out with a probe with a more complex structure.

FIGS. 6 to 9 show the influence of the geometrical parameters on the frequency spectrum and thus on the determination of the resonance frequency from the electron density. For the spectrum is depicted in FIG. 6, the ratio $R_e/R_d$ is 0.9. The probe has a simple structure as shown in FIGS. 1 and 2. The relative boundary layer thickness $d/R_e$ is assumed as 0.01. ω denotes the angular frequency of applied high-frequency signal, $\omega_p$ is the plasma frequency of the plasma. It is evident that a probe of this geometry exhibits a very distinct peak at $\omega/\omega_p$ of about 0.34, whereas higher modes play a lesser role.

With the same ratio $R_e/R_d$ and the same relative boundary layer thickness $d/R_d$ but with a more complex structure of the electrode head, as shown in FIG. 3, a frequency spectrum results which is different form FIG. 6. In addition to the primary peak, which is again located at about 0.34, an accumulation of additional peaks can be seen between 0.5 and 0.6. This also reflects the distribution of the multipole coefficients in FIG. 3.

Figure 8:
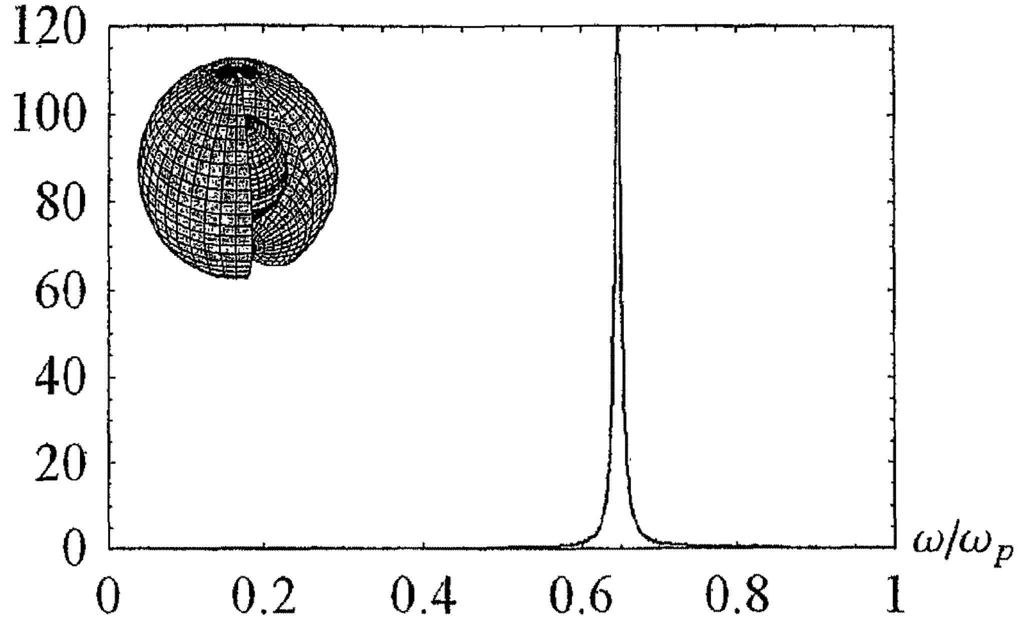
FIG. 8 a spectrogram of a probe with a complex structure and a smaller radius ratio.
Figure 9:
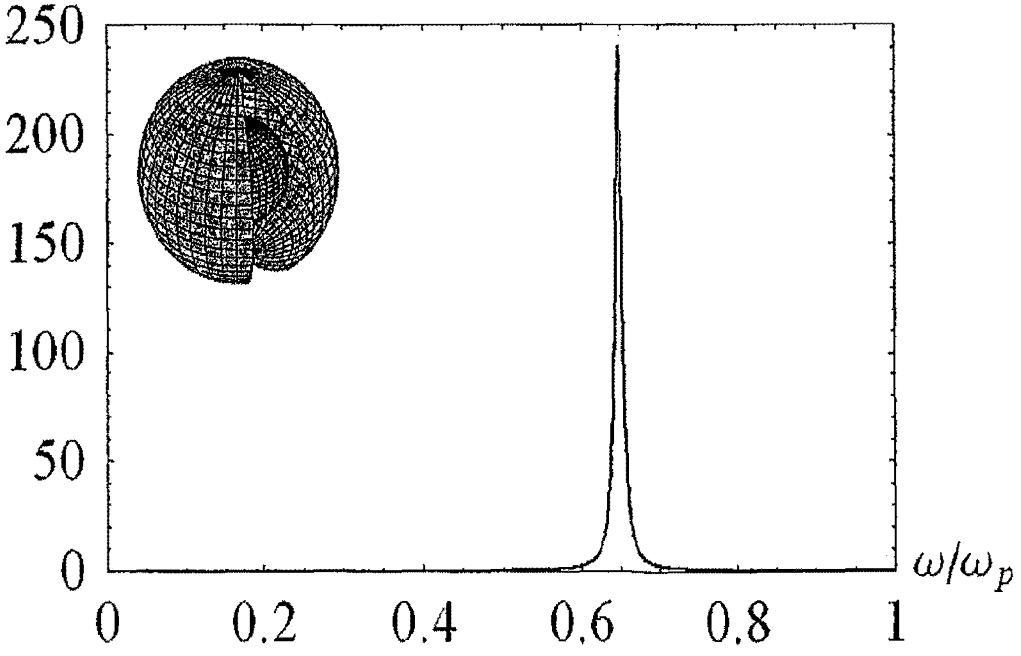
FIG. 9 a spectrogram of a probe with simple structure and smaller radius ratio.

When the radius ratio is changed to $R_e/R_d=0.5$, the mathematical model produces the resonance frequencies shown in FIGS. 8 and 9. The clearly smaller probe core of FIG. 8 has a complex circuit structure, as was the basis for the measurement of FIG. 7. Only a single, very distinct peak at 0.65 is visible. An unambiguous frequency spectrum is obtained even with a simpler surface circuit structure of the probe head (FIG. 9) with a ratio of $R_e/R_d=0.5$ and a relative boundary layer thickness of $d/R_e=0.01$. The sole peak is again at 0.65 and gives an unambiguous indication of the plasma density.

Figure 10:
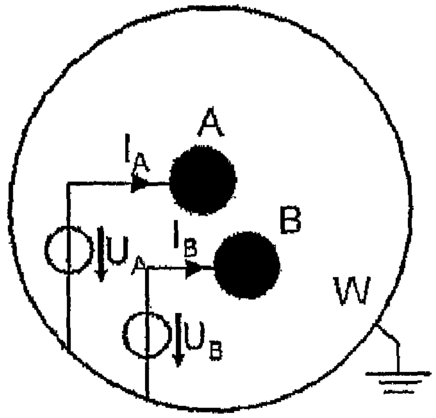
FIG. 10 an illustration of the abstract model of a plasma absorption probe of arbitrary design which underlies the analysis.

FIG. 10 shows schematically the model on which the abstract analysis of the plasma absorption method is based. Two electrodes A, B extend into a closed region, with the plasma with an unknown distribution and the dielectric material disposed in between. High-frequency potentials $U_A$ und $U_B$ are coupled into the plasma via these electrodes; the corresponding currents $I_A$ and $I_B$ are measured. A coupling exists between the two electrodes A, B themselves, and between the electrodes A, B, respectively, and the wall W. The wall W is assumed to be grounded, i.e., it has zero potential with respect to the high-frequency.

Figure 11:
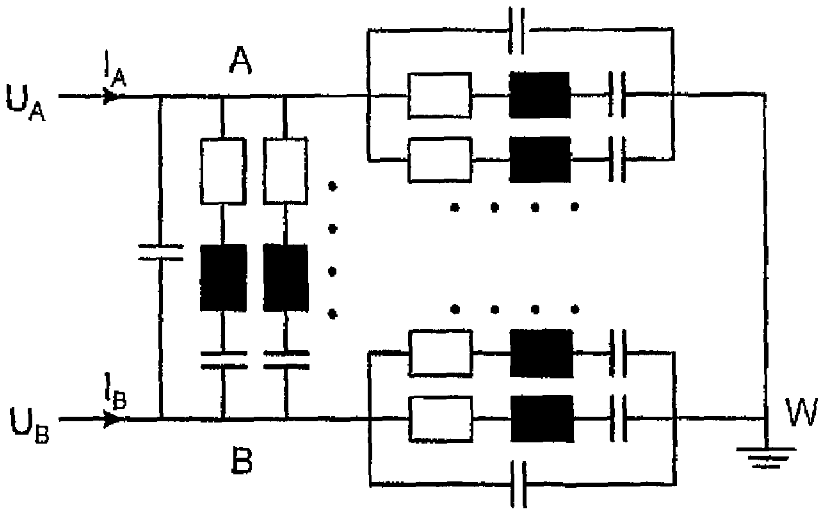
FIG. 11 a schematic electrical circuit diagram of a plasma absorption probe of arbitrary design according to the mathematical model.

FIG. 11 shows the equivalent circuit diagram of the plasma absorption method, as determined by abstract theoretical analysis, for a general electrode geometry. The coupling between the electrodes A, B themselves, and the coupling between the electrodes A, B and the wall W are illustrated, with each branch consisting of a capacitive coupling and a parallel connection of an infinite number of series resonance circuits.

Figure 12:
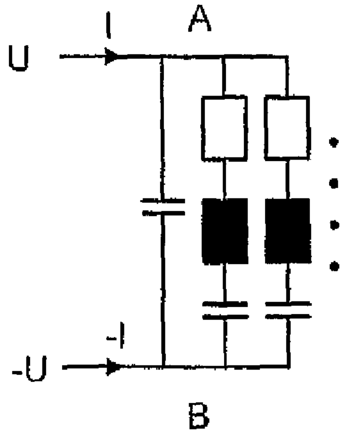
FIG. 12 a schematic electrical circuit diagram of a multipole resonance probe according to the present invention.

FIG. 12 shows the equivalent circuit diagram of the novel multipole absorption probe. The symmetric shape of the probe suppresses coupling to the chamber wall W. Only the path between the electrodes A, B remains. In addition, the values of the resonance circuit can now be calculated analytically.

Due to the high accuracy of the method, the unambiguous evaluation rule, and the local character of the measurement, the device according to the invention and/or a measurement based on a use of the device according to the invention is exceptionally industry-compatible and can be used with various applications due to its robustness and low cost.

What is claimed is:

1. A device for measuring a density of a plasma, comprising:

a probe having a probe head in form of a three-axes ellipsoid, the probe head including a sheath and a probe core surrounded by the sheath, with a surface of the probe core having electrode areas with opposite polarity which are insulated from each other, and means for coupling a signal into the probe head means for determining a resonance frequency in response to the coupled signal; and means for determining the plasma density from the resonance frequency with an evaluation rule.

2. The device of claim 1, where the probe head is in form of a sphere.

3. The device of claim 1, wherein the probe head is mirror-symmetric with respect to a transverse center plane extending through a center of the probe core.

4. The device of claim 1, wherein the sheath has a constant wall thickness.

5. The device of claim 3, wherein the electrode areas with opposite polarity are located parallel to the transverse center plane.

6. The device of claim 3, wherein the electrode areas with opposite polarity are arranged mirror-symmetrically with respect to the transverse center plane.

7. The device of claim 3, wherein the probe head comprises a single area with a single polarity on each side of the transverse center plane.

8. The device of claim 1, wherein the probe head is connected to a handle by which the signal is electrically coupled into the probe head.

9. The device of claim 1, wherein the probe head is connected to a handle by which the signal is opto-electronically coupled into the probe head.

10. The device of claim 1, wherein the means for coupling the signal are disposed inside the probe head.

11. The device of claim 1, wherein the means for coupling a signal comprise an oscillating circuit which is excited to oscillate with a local frequency of the plasma surrounding the probe.

12. The device of claim 1, wherein the probe head is connected to a handle by which the signal is coupled into the probe head, and wherein the sheath surrounds the handle.

13. The device of claim 1, wherein the signal is a high-frequency signal.

14. The device of claim 1, wherein the signal is a broadband signal generated by a pulse train.

15. A method for measuring a density of a plasma, comprising the steps of:

coupling a signal to a probe head in the form of a three-axes ellipsoid, the probe head including a sheath and a probe core surrounded by the sheath, with a surface of the probe core having electrode areas with opposite polarity which is insulated from each other; and determining the plasma density from a resonance frequency in response to the coupled signal with an evaluation rule.

* * * * *

UNITED STATES PATENT AND TRADEMARK OFFICE

CERTIFICATE OF CORRECTION

PATENT NO. : 7,878,045 B2
APPLICATION NO. : 12/294322
DATED : February 1, 2011
INVENTOR(S) : Ralf-Peter Brinkmann It is certified that error appears in the above-identified patent and that said Letters Patent is hereby corrected as shown below:

Column 2, line 24, change "ca" to -- can --.

Column 5, line 20, change formula to -- $\omega_{res}^2 \approx 0{,}583\omega_p^2$ --.

Column 5, line 25, change formula to -- $n_e \approx 2{,}1 f_{GHZ}^2 \times 10^{10} cm^{-3}$ --.

Signed and Sealed this
Twenty-sixth Day of April, 2011

David J. Kappos
*Director of the United States Patent and Trademark Office*